Feb. 4, 1936. E. H. MUELLER 2,029,737
ATTACHING MEANS FOR HANDLES
Filed March 23, 1935
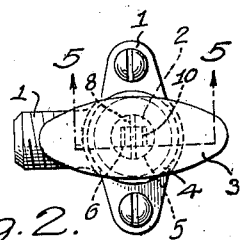
Fig. 2.
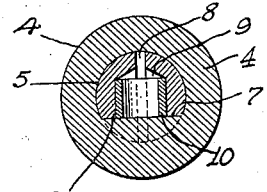
Fig. 3.
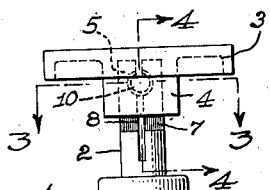
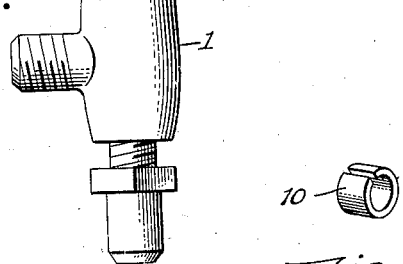
Fig. 1.
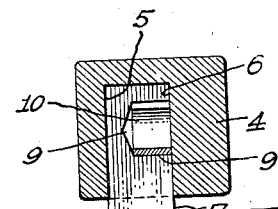
Fig. 4.
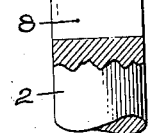
Fig. 8.
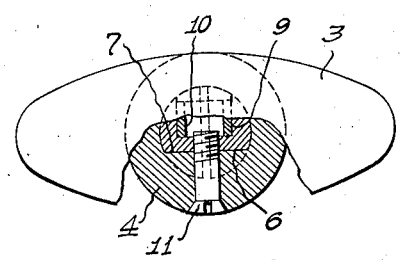
Fig. 5.
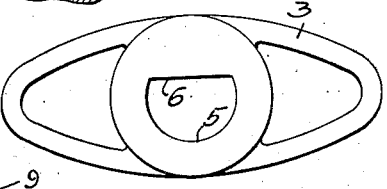
Fig. 7.
Fig. 6.
INVENTOR.
Ervin H. Mueller,
BY
ATTORNEYS
Fig. 9.

Patented Feb. 4, 1936

2,029,737

UNITED STATES PATENT OFFICE 2,029,737

ATTACHING MEANS FOR HANDLES

Ervin H. Mueller, Grosse Pointe Park, Mich.

Application March 28, 1935, Serial No. 13,472

3 Claims. (Cl. 287—53)

This invention relates to means particularly adapted for detachably attaching an operating handle formed of a comparatively fragile material, to the stem of a gas range valve, and its object is to provide an arrangement whereby the stem of the valve may be split to make it expansible for engagement within a socket in the handle without materially weakening the stem, and to provide the stem with means for expanding or spreading apart the split parts of the stem, to give further firm engagement thereof within the handle socket and to firmly hold the handle engaged with the stem without the necessity for other fastening means so that the handle need not be weakened by the application of such supplemental fastening thereto. It is also an object to provide simple and easily installed means for yieldingly spreading apart the split parts of the stem, said means being arranged to reinforce these parts and take the thrust so that the stem is not weakened and the parts of the stem will not be broken by their deflection under the strains of attaching the handle or the turning of the valve stem by means of the handle.

It is also an object to provide a spring member for insertion between the split parts of the stem, which member is so constructed and arranged as to make it conveniently insertable within a transverse bore in the stem, and to provide certain other new and useful features in the construction, arrangement and combination of parts, all as hereinafter more fully described, reference being had to the accompanying drawing in which—

Fig. 1 is a side elevation of a valve showing a handle applied to the stem thereof and illustrative of an embodiment of the invention;

Fig. 2 is an end elevation of Fig. 1;

Fig. 3 is an enlarged section upon the line 3—3 of Fig. 1;

Fig. 4 is a section upon the line 4—4 of Fig. 1;

Fig. 5 is a longitudinal section upon the line 5—5 of Fig. 2;

Fig. 6 is a perspective view of the upper end of the stem;

Fig. 7 is a bottom plan view of the handle detached;

Fig. 8 is a perspective view of the expansion spring, and

Fig. 9 is a sectional view similar to Fig. 3, showing a modified construction where the handle is secured in place upon the stem by means of a screw.

As shown in the drawing, 1 indicates a valve as a whole, said valve being of any old and well known construction having a stem 2 to which a handle 3 for turning the stem is applied, said handle being of any suitable form in which a hub 4 of the handle is formed with a socket 5 extending thereinto from its lower side, said socket being circular in cross section with a flat or straight side 6 and the stem being also of cylindrical form to fit within the socket, said stem being cut away at one side, as at 7, to provide a flat side on the stem to engage the flat side of the socket and thus prevent the handle from turning upon the stem.

In the present construction where a bakelite handle is to be attached to a valve stem, the stem is split, as at 8 at right angles to the flat side 7 of the stem and then the stem is formed with a transverse bore 9 near its upper end extending part way through the stem, the longitudinal axis of this bore being coincident with the slit 8 in the stem, and to provide for holding the split parts of the stem apart, or in expanded position, a split spring ring 10 is inserted in the bore 9 and by its expansive force tends to hold the split parts of the stem spread apart and also forms a reinforcement for these parts in that it extends across the split, and when strain is put upon the stem, transfers the strain from one to the other of these split parts to avoid the possibility of their becoming fractured by the bending or flexing of these parts under the strain of turning the stem by means of the handle or in applying the handle thereto.

With this arrangement the split parts of the stem are held spread apart slightly by the force of the spring 10 and when this end of the stem is inserted within the socket of the head of the handle, the expanded end of the stem fits closely within the socket and sufficient friction therebetween is created to firmly hold the handle in place upon the stem against accidental displacement in use, and other fastening means passing through an opening in the head of the handle, which would weaken this fragile handle, is not necessary.

The application of the spring 10 to hold the split parts of the stem separated is greatly facilitated by forming this upper end of the stem with the short transverse bore 9 to receive the split spring ring which is inserted in the bore under compression and when in place, this spring exerting a pressure upon the two parts of the stem, will take the strain applied to one of the split parts and transfer it to the other when the handle is forced into place upon the stem or when the stem is turned by means of the handle, thus preventing the cracking or breaking of the split end of the stem in use, and the head of the handle will be strong enough to withstand this expansive force.

Each of the split parts of the stem has the maximum cross-sectional area by splitting the stem at right angles to its flat face, and by reinforcing this split end of the stem by means of the spring 10 inserted within the transverse bore in the stem, a very strong and rigid connection of the handle to the stem is provided and the reinforcing spring 10 is entirely concealed within the head of the handle. As shown in the accompanying drawing, this bore 9 for the spring 10 is bored transversely of the stem inwardly from the flat side thereof except in Fig. 9 where this bore is formed in the opposite or convex side of the stem so that a small screw-threaded opening may be provided in said flat side in line with said bore to receive a securing screw 11 passing through an opening in the hub or head of the handle to hold the handle against any possible displacement from the stem, but ordinarily such fastening screw will not be necessary as the force of the spring 10 will be sufficient to hold the handle in place on the stem.

Obviously, while the present invention may be employed to hold any detachable part upon the end of a split stem or shaft it is particularly adaptable for holding a bakelite handle, and may also be used in connection with any form of valve having a projecting stem.

It is also obvious that changes may be made in the particular construction of parts and their combination and arrangement as shown, without departing from the spirit of the invention, and I do not, therefore, limit myself to the particular construction shown.

Having thus fully described my invention, what I claim is:—

1. In a device for the purpose described the combination of a member split longitudinally inward from one end and formed with a bore extending transversely of said split end with the longitudinal axis of the bore coincident with the said split, a handle member formed with a socket to receive the split end of said member, and a spring within said transverse bore to spread the split parts of the member apart and frictionally hold the split ends engaged within the handle socket.

2. Means for detachably securing a handle to the stem of a valve, said means comprising a split end on the stem formed with a transverse bore adjacent the end of the stem, a handle member formed with a socket to receive the split end of the stem, and a spring of split ring form within said bore to spread the split end portions of the stem apart.

3. The combination of a valve stem split longitudinally inward from one end and having a flattened side with the face of said side extending at right angles to the plane of said split, said stem being also formed with a shallow bore extending transversely of the stem with the longitudinal axis of the bore coincident with the split of the stem, a split spring ring within said bore, and a handle formed with a head having a socket extending thereinto from one side of the head and adapted to receive the split end portion of the stem, said socket having a flat side to cooperate with the flat side of the stem in preventing the turning of the handle relative to the stem.

ERVIN H. MUELLER.